United States Patent
Kawai et al.

(10) Patent No.: US 8,392,719 B2
(45) Date of Patent: Mar. 5, 2013

(54) COMPUTER READABLE STORAGE MEDIUM STORING SOFTWARE EXECUTION CONTROL PROGRAM, SOFTWARE EXECUTION CONTROL METHOD AND SOFTWARE EXECUTION CONTROL SYSTEM

(75) Inventors: Tomohito Kawai, Tokyo (JP); Yoichi Sakajiri, Tokyo (JP); Yoshiro Miyajima, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 1055 days.

(21) Appl. No.: 11/875,289

(22) Filed: Oct. 19, 2007

(65) Prior Publication Data

US 2008/0276312 A1    Nov. 6, 2008

(30) Foreign Application Priority Data

Oct. 20, 2006   (JP) ................. 2006-286421

(51) Int. Cl.
*G06F 21/00* (2006.01)
(52) U.S. Cl. ......................... 713/183; 726/28
(58) Field of Classification Search .................... None
See application file for complete search history.

(56) References Cited

U.S. PATENT DOCUMENTS

| | | | | |
|---|---|---|---|---|
| 4,720,860 A | * | 1/1988 | Weiss | 713/184 |
| 5,226,080 A | * | 7/1993 | Cole et al. | 713/183 |
| 5,638,513 A | * | 6/1997 | Ananda | 726/5 |
| 5,661,807 A | * | 8/1997 | Guski et al. | 713/159 |
| 5,937,068 A | * | 8/1999 | Audebert | 713/185 |
| 6,178,236 B1 | * | 1/2001 | Jreij et al. | 379/188 |
| 6,480,958 B1 | * | 11/2002 | Harrington | 713/184 |
| 6,904,526 B1 | * | 6/2005 | Hongwei | 713/182 |
| 7,451,313 B1 | * | 11/2008 | Chang et al. | 713/168 |
| 7,600,128 B2 | * | 10/2009 | Pritchard et al. | 713/184 |
| 7,650,509 B1 | * | 1/2010 | Dunning | 713/184 |
| 2002/0112183 A1 | * | 8/2002 | Baird et al. | 713/201 |
| 2003/0137398 A1 | * | 7/2003 | Shibata et al. | 340/5.61 |
| 2005/0060552 A1 | * | 3/2005 | Sugimura et al. | 713/182 |
| 2007/0050635 A1 | * | 3/2007 | Popp | 713/185 |
| 2007/0169178 A1 | * | 7/2007 | Keohane et al. | 726/4 |

FOREIGN PATENT DOCUMENTS

JP    11-110209    4/1999

(Continued)

OTHER PUBLICATIONS

"Server Private Key Encryption based User Authentication Management", Nov. 1, 2001, IBM technical Disclosure Bulletin, Issue 451, p. 1970.*

(Continued)

*Primary Examiner* — Nathan Flynn
*Assistant Examiner* — Michael R Vaughan
(74) *Attorney, Agent, or Firm* — Oblon, Spivak, McClelland, Maier & Neustadt, L.L.P.

(57) ABSTRACT

A character string indicating a date obtained from a calendar clock is combined with a fixed-value character string held internally to generate a hash character string using a hash function. The hash character string is compared with an input character string. When there is a match, the body portion of an application software is executed. When there is no match, a process is terminated without executing the body portion of the application software.

5 Claims, 8 Drawing Sheets

FOREIGN PATENT DOCUMENTS

| | | |
|---|---|---|
| JP | 2000250750 A * | 9/2000 |
| JP | 2003-216872 | 7/2003 |
| JP | 2004-265221 | 9/2004 |
| JP | 2005078165 A * | 3/2005 |
| JP | 2006-18773 | 1/2006 |
| WO | WO 9736221 A1 * | 10/1997 |
| WO | WO 2006044717 A2 * | 4/2006 |

OTHER PUBLICATIONS

Japanese Office Action issued Sep. 27, 2011, in Patent Application No. 2006-286421.

Japanese Office Action issued Mar. 13, 2012, in Japan Patent Application No. 2006-286421.

* cited by examiner

COMPUTER READABLE STORAGE MEDIUM STORING SOFTWARE EXECUTION CONTROL PROGRAM, SOFTWARE EXECUTION CONTROL METHOD AND SOFTWARE EXECUTION CONTROL SYSTEM

BACKGROUND OF THE INVENTION

1. Field of the Invention

The present invention relates to a method for controlling execution of software, a program therefor, and a software execution control system. More particularly, the present invention relates to a method for easily achieving control of period-limited execution of a target program without using resources, such as a network, a program for the method, and a software execution control system.

2. Description of the Related Art

Some programs are not intended to be frequently executed by a user. For example, there is a case where when some abnormality occurs in a personal computer of a client, an OA (Office Automation) system service requires extraction of a part of the system registry of an OS (Operating System), a log of the results of executing a virus checker, or the like. Such a work is carried out by a system service person who directly visits the client.

When the number of clients becomes very large, such call-on attendance becomes unfeasible.

To cope with the problem, an examination tool (program) which allows a client to do the work is developed and is installed on the personal computer of the client.

The client executes the examination tool (program) when needed, i.e., when some fault occurs in the personal computer in use.

The examination tool (program) is disclosed in, for example, Unexamined Japanese Patent Application KOKAI Publication No. 2003-216872.

The examination tool, due to the nature thereof, should not be executed without reason, and should be executed by a system service person visiting a client. It is however dangerous to count only on the morals of each client.

The aforementioned document discloses how to control execution of a program. The technique described in the document needs access to a server over a network.

Accordingly, it is an object of the present invention to provide a method for easily achieving control of period-limited execution of a target program without using resources, such as a network, and a program and a system for the method.

SUMMARY OF THE INVENTION

To achieve the object, a predetermined password character string is generated by combining a fixed value comprised of a character string and a date character string generated by a date character string generation unit. The input character string is collated with a password generated previous, and a predetermined program is executed when there is a match.

Normally, a password permanently permits access or the like to a target.

To permit execution of a program only for one day, it is necessary to generate a password every time the program is to be executed.

With the above situation in mind, the present inventor has come up with an idea of combining a date character string and a predetermined character string to generate a specific character string to be a password using a hash function.

According to one aspect of the invention, there is provided a computer readable storage medium storing a software execution control program which allows a computer to realize:

a fixed-value acquisition unit that acquires a fixed value comprised of a character string;

a time character string generation unit that generates a time character string indicating a current time;

a password generation unit that generates a predetermined character string by combining the fixed value acquired by the fixed-value acquisition unit and the time character string acquired from the time character string generation unit; and a match determination unit that collates an input character string with the character string acquired from the password generation unit, and executes a predetermined program when there is a match.

According to a second aspect of the invention, there is provided a computer readable storage medium storing a software execution control program which allows a computer to realize:

a period extraction unit that extracts a period character string indicating a period from an input character string;

a fixed-value acquisition unit that acquires a fixed value comprised of a character string;

a date character string generation unit that generates a time character string indicating a current time;

a password generation unit that generates a predetermined character string by combining the fixed value acquired by the fixed-value acquisition unit, the time character string acquired from the date character string generation unit and the period character string acquired from the period extraction unit; and a match determination unit that collates a whole input character string or a part thereof with the character string acquired from the password generation unit, and executes a predetermined program when there is a match.

According to a third aspect of the invention, there is provided a software execution control method for allowing a predetermined apparatus to execute a program, comprising:

a password reception step of displaying a user interface to obtain an input of a password and accepting an input of the input password;

a password generation step of generating a generation password from a fixed value held in the apparatus and a time character string indicating a current time, acquired from a calendar clock provided in the apparatus, by using a predetermined algorithm;

a match determination step of collating an input password input at the password reception step with the generation password generated at the password generation step, and executing a target program when a character string of the input password matches with a character string of the generation password.

According to a fourth aspect of the invention, there is provided a software execution control method for allowing a predetermined apparatus to execute a target program, comprising:

a password reception step of displaying a user interface to obtain an input of a password and accepting an input of the input password;

a period extraction step of extracting a period character string indicating a period from an input password input at the password reception step;

a password generation step of generating a generation password from a fixed value held in the apparatus, a time character string indicating a current time, acquired from a calendar clock provided in the apparatus, and the period character string acquired at the period extraction step by using a predetermined algorithm;

a match determination step of collating an input password input at the password reception step with the generation password generated at the password generation step, and executing a target program when a character string of the input password matches with a character string of the generation password.

According to a fifth aspect of the invention, there is provided a software execution control system having a password generation device which generates a password and a terminal device which executes a target program based on the password, the password generation device comprising:

a fixed-value acquisition unit that acquires a fixed-value character string;

a time acquisition unit that acquires a time character string indicating a time;

a period acquisition unit that acquires a period character string indicating a period; and a basic password generation unit that generates a basic password from the fixed-value character string acquired by the fixed-value acquisition unit, the time character string acquired by the time acquisition unit and the period character string acquired by the period acquisition unit by using a predetermined algorithm, the terminal device comprising:

a password reception unit that displays a user interface to obtain an input of a password and accepts an input of the input password;

a period extraction unit that extracts a period character string indicating a period from the input password accepted by the password reception unit;

a password generation unit that generates a generation password from a fixed value held in the apparatus, a time character string indicating a current time, acquired from a calendar clock provided in the apparatus, and the period character string extracted by the period extraction unit by using a same algorithm as the predetermined algorithm;

a match determination unit that collates an input password received by the password reception unit with the generation password generated by the password generation unit, and executing the target program when a character string of the input password matches with a character string of the generation password or when the input password is identical to the basic password.

BRIEF DESCRIPTION OF THE DRAWINGS

These objects and other objects and advantages of the present invention will become more apparent upon reading of the following description and the accompanying drawings in which.

DETAILED DESCRIPTION OF THE PREFERRED EMBODIMENTS

Preferred embodiments of the present invention will be described below with reference to the accompanying drawings.

Figure 1A:
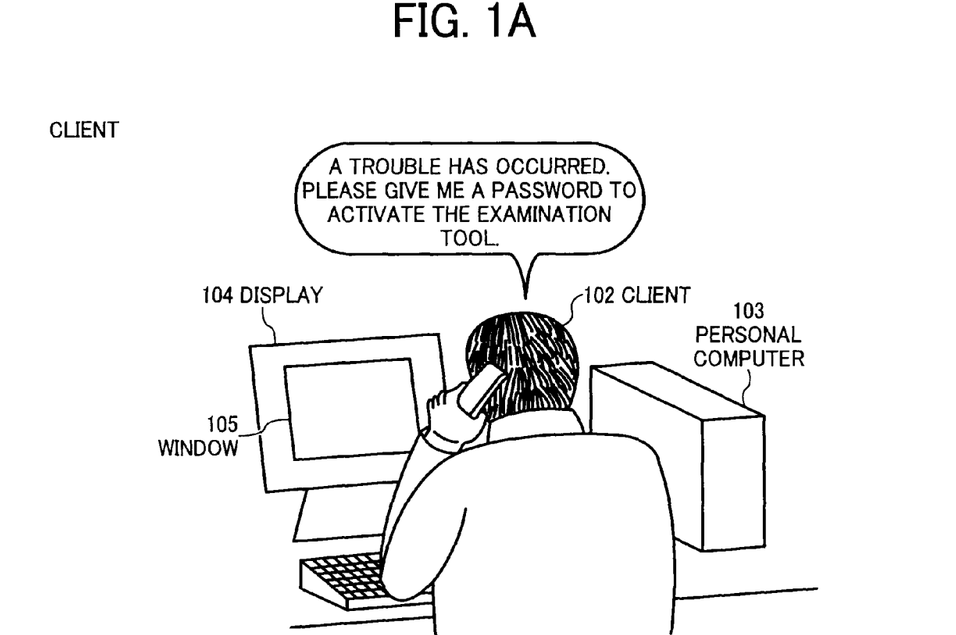
FIGS. 1A and 1B are exemplary diagrams for explaining an actual operational mode using an execution control program according to a first embodiment of the present invention.
Figure 1B:
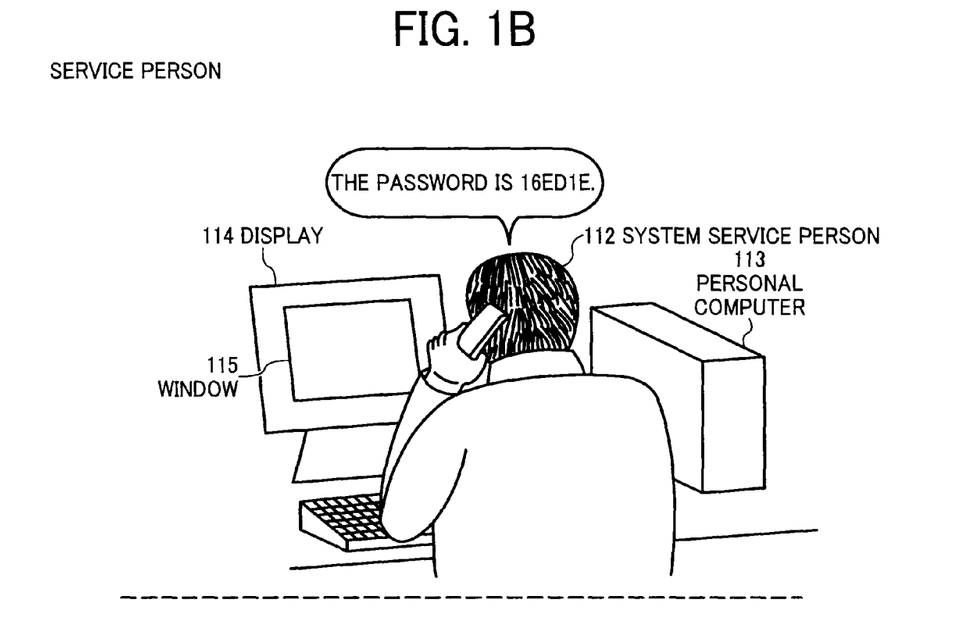

FIGS. 1A and 1B are diagrams exemplarily illustrating an actual operational mode using an execution control program according to a first embodiment of the present invention.

Figure 2A:
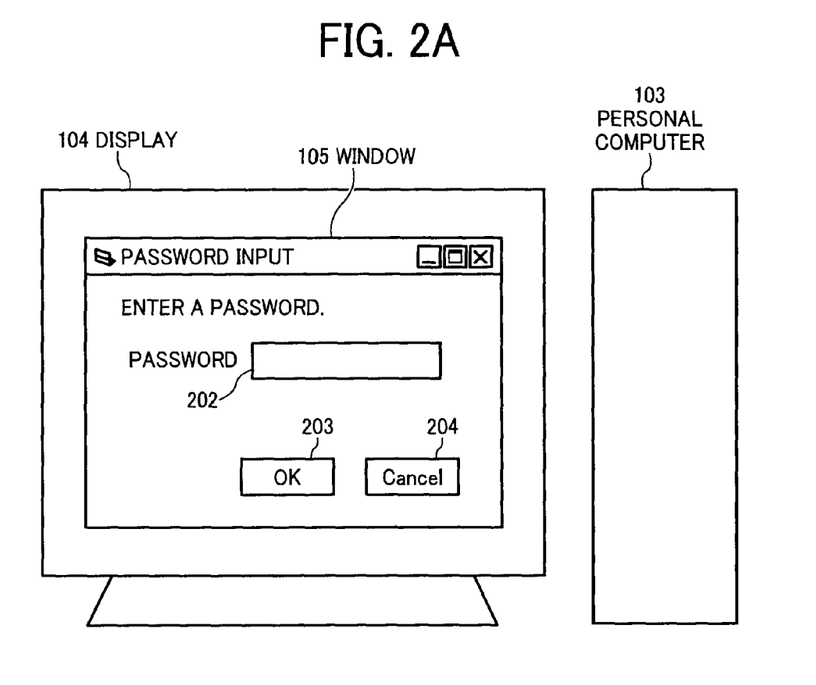
FIGS. 2A and 2B are diagrams showing execution screens of an examination tool having the execution control program according to the embodiment of the invention installed therein.

FIG. 1A is a diagram illustrating a client 102 using a personal computer 103. The client 102 executes a examination tool in the personal computer 103. Then, a display 104 shows a window 105 in a state where the examination tool having an execution control program installed therein is executed. This window 105 is a GUI (Graphical User Interface) as shown in FIG. 2A.

The client 102 makes a phone call to a system service person 112 at a company with which the client 102 has contracted for maintenance in using the personal computer 103, and asks a password for activating the examination tool. As shown in FIG. 1B, in response to the inquiry from the client 102, the system service person 112 activates a password generation tool to generate a password to make the examination tool active only for a day, and gives the password to the client 102 by telephone.

The examination tool has a function which is executed by the client 102 when the personal computer 103 of the client 102 has some abnormality and sends the execution result to the system service person 112 by mail.

Microsoft Windows (registered trademark) is running on the personal computer 103 of the client 102. The examination tool extracts a part of a system registry or extracts a log or the like of the result of executing a virus checker, compresses the information, and sends an e-mail having the information as an attached file to the system service person 112.

The examination tool, due to the nature thereof, should not be executed without reason, and should be executed by the system service person 112 who would visit the client 102. There is a case where the time and locational restrictions make a call-on attendance service difficult or a case where the client 102 is permitted to carry out only restrictive execution of the examination tool in consideration of the efficiency. For such restrictive execution, it is necessary to perform execution control with a valid password only for a day.

Figure 2B:
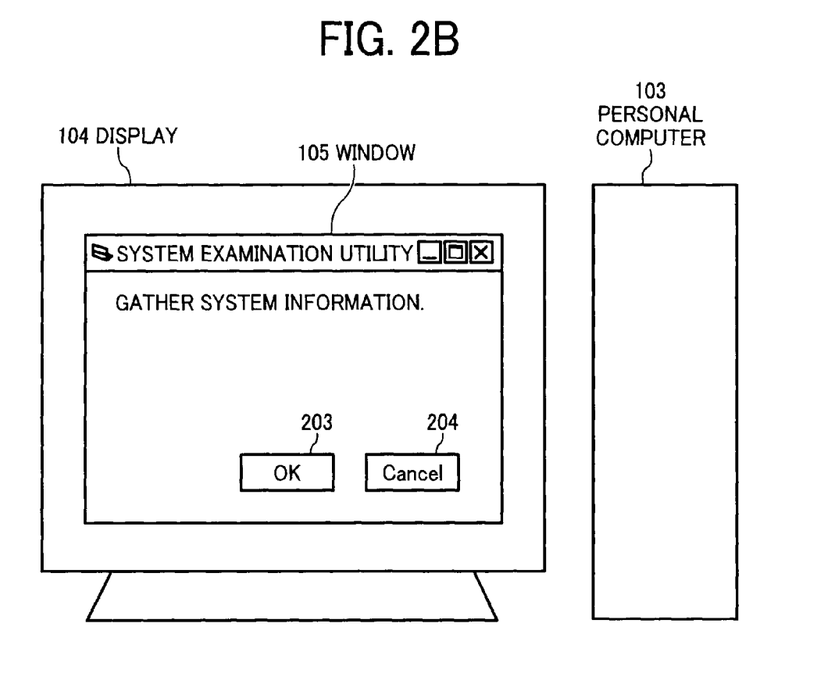

FIGS. 2A and 2B are diagrams showing execution screens of the examination tool having the execution control program according to the embodiment of the invention installed therein.

FIG. 2A shows a display screen immediately after the execution of the examination tool.

A password input field 202, an OK button 203 and a Cancel button 204 are provided on the window 105.

The client 102 enters a password given by the system service person 112 into the password input field 202, and presses the OK button 203. Then, when the password is correct, the examination tool becomes executable as shown in FIG. 2B. If the password is incorrect, the screen of FIG. 2B is not displayed and the program is terminated.

Figure 3:
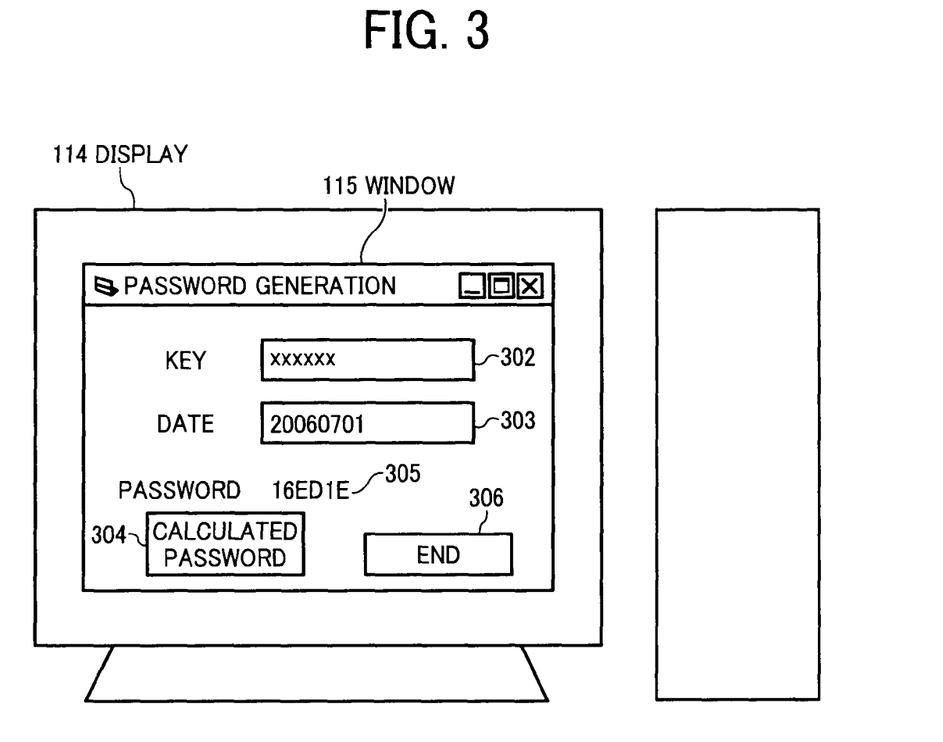
FIG. 3 is a diagram showing a display screen of a password generation tool.

FIG. 3 is a diagram showing a display screen of the password generation tool.

A fixed-value input field 302 and a date input field 303 are provided on a window 115 which is displayed when the password generation tool is executed. When a Calculate Password button 304 is pressed after a fixed value and a date are input, a password is shown in a password display field 305.

Figure 4A:
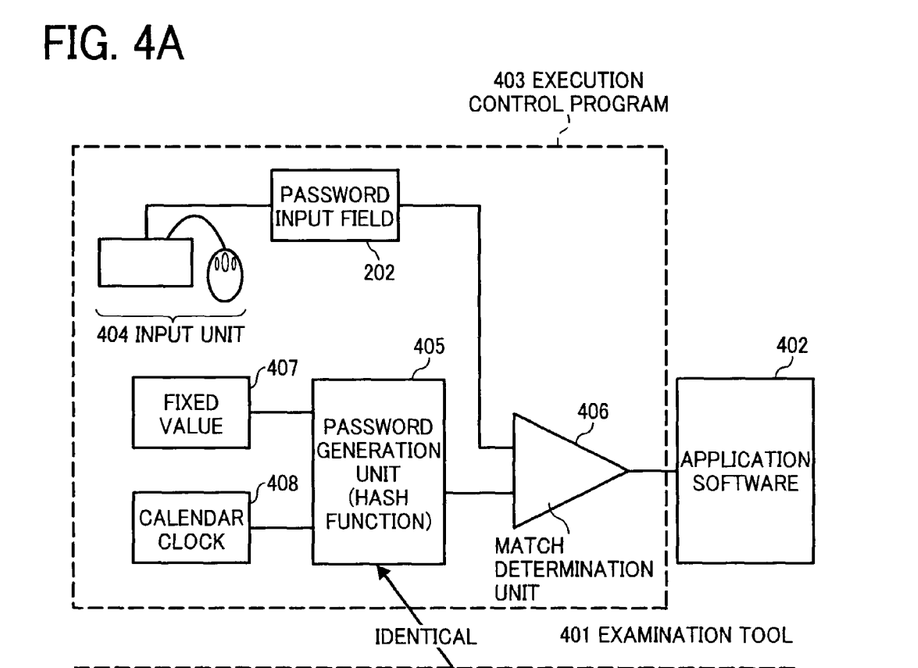
FIG. 4A is a functional block diagram of the examination tool including the execution control program.
Figure 4B:
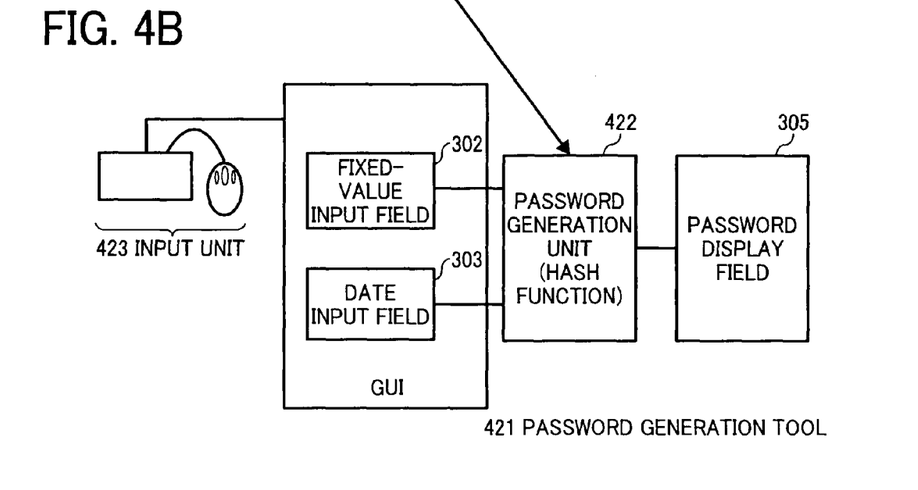
FIG. 4B is a functional block diagram of the password generation tool.

FIGS. 4A and 4B are functional block diagrams of the examination tool including the execution control program and the password generation tool.

FIG. 4A is a block diagram of an examination tool 401. The body of the examination tool 401 is integrated into application software 402. The essential portion of the embodiment is an execution control program 403 which performs execution control of the application software 402.

An input unit 404 includes a keyboard and a pointing device both connected to the personal computer 103.

The password input field 202 is an input field provided in the GUI of an initial screen. A match determination unit 406 determines whether a password input in the field 202 matches with a password generated by a password generation unit 405 or not.

When the two passwords input match with each other, the match determination unit 406 executes the application software 402.

The password generation unit 405 generates a password based on a fixed value 407 embedded in the program and a date character string acquired from a calendar clock 408 built in the personal computer 103. That is, a password which differs daily is generated.

FIG. 4B is a block diagram of a password generation tool 421. The body of the password generation tool 421 includes a password generation unit 422 and a GUI which activates the password generation unit 422.

An input unit 423 includes a keyboard and a pointing device both connected to a personal computer 113.

The fixed-value input field 302 and the date input field 303 are input fields provided in the GUI of an execution screen.

The password generation unit 422 generates a password based on a character string of the fixed value 407 input in the fixed-value input field 302 and a date character string input in the date input field 303.

The password generation unit 405 in FIG. 4A and the password generation unit 422 in FIG. 4B are configured by quite the same algorithm which, for example, is a hash function.

The system service person 112 previously knows the fixed value 407 of the examination tool 401 installed in the personal computer 103 of the client 102. That is, when the client 102 inquires about a password on a telephone, the system service person 112 enters the fixed value 407 in the fixed-value input field 302 and enters a date of the inquiry in the date input field 303. Then, a password which the client 102 wants and is valid only for that day is generated on a password display section.

Figure 5:
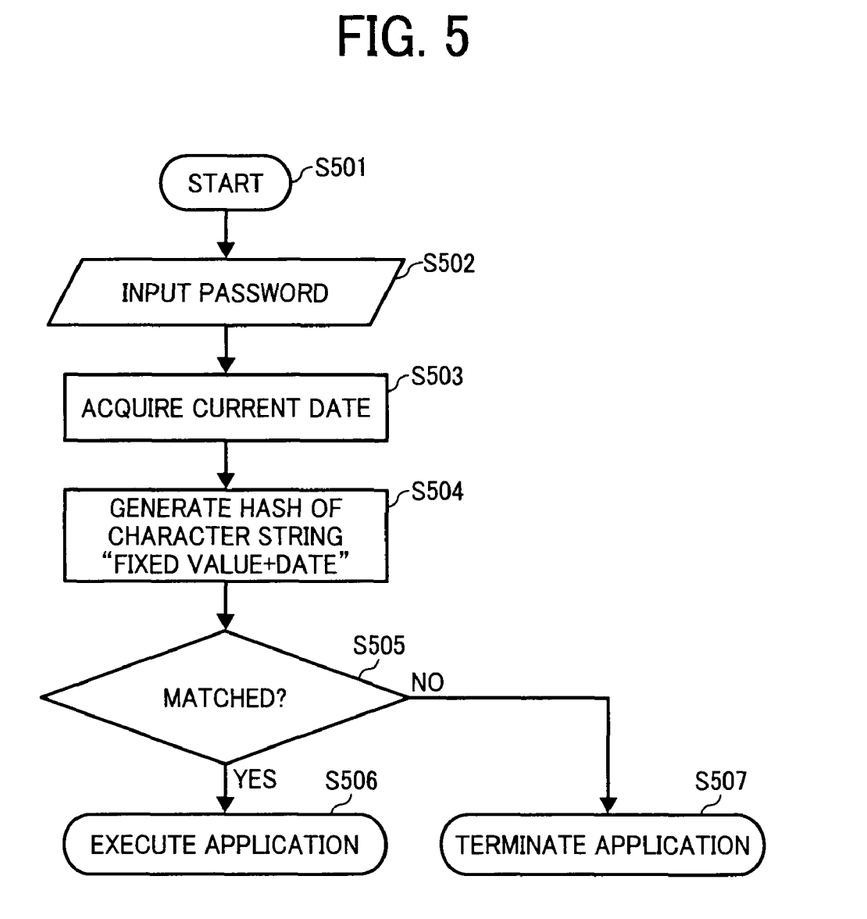
FIG. 5 is a flowchart of the execution control program.

FIG. 5 is a flowchart of the execution control program 403 included in the examination tool 401.

When the execution control program 403 is activated (S501), the execution control program 403 displays a password input screen on the display 104 of the personal computer 103, and waits for a password input by the user (S502).

When the user enters the password and presses the OK button 203, the password generation unit 405 acquires a current date from the calendar clock 408 (S503).

Then, the password generation unit 405 generates a hash character string using the hash function which is the body of the password generation unit 405, based on the character string of the fixed value 407 held internally and a character string of the date (S504).

The match determination unit 406 determines whether the generated hash character string matches with the input password character string or not (S505).

When there is a match (S505: YES), the application software 402 of the examination tool 401 is activated (S506).

When there is no match (S505: NO), the personal computer 103 terminates the application software 402 (S507).

According to the first embodiment, the execution control program 403 which performs execution control using a password valid only for a day is installed in the examination tool 401.

The execution control program 403 according to the first embodiment restrictively executes the examination tool 401 when the time and locational restrictions make it difficult to execute the examination tool 401 on a call-on attendance basis or when the client is permitted to carry out restrictive execution of the examination tool 401 in consideration of the efficiency.

That is, the execution control program 403 permits the client to restrictively execute the examination tool 401, thereby relieving the trouble of the call-on attendance service and providing the client with a prompt service.

If a password is leaked, the password can be used only for a day. That is, if the password is leaked, a leak-originated risk on security lasts only one day, so that it can be expected that possible damages are minimized.

Figure 6:
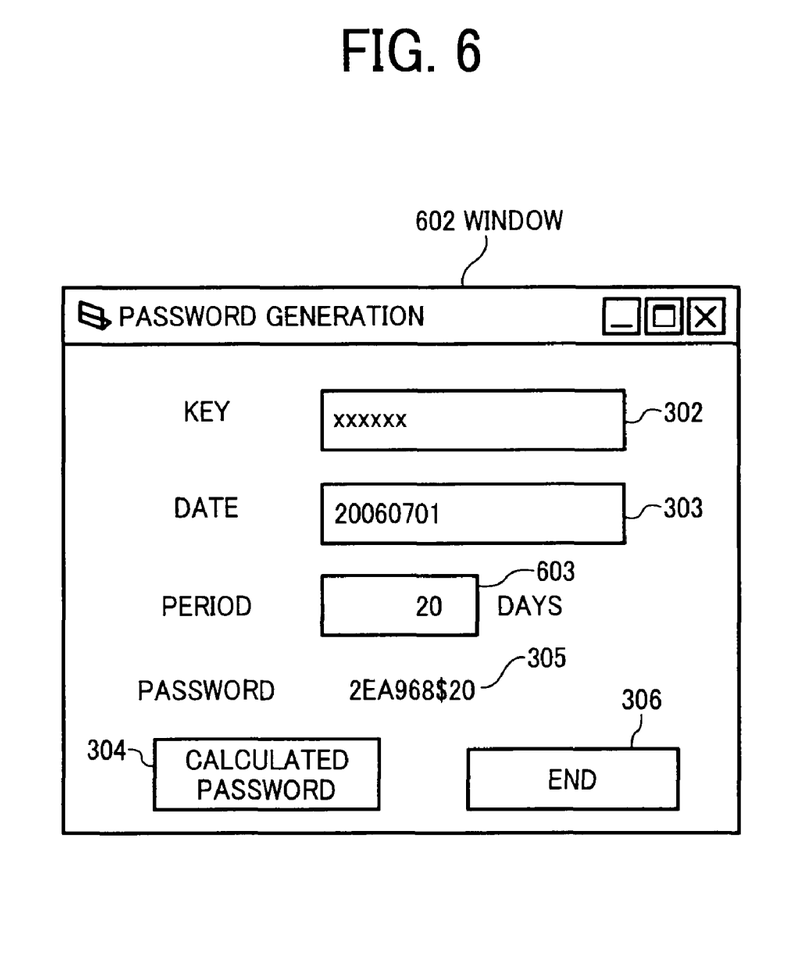
FIG. 6 is a diagram showing a display screen of a password generation tool according to a second embodiment of the invention.

FIG. 6 is a diagram showing a display screen of a password generation tool 421 according to a second embodiment of the invention.

Because the display screen of software according to the second embodiment is identical to the one shown in FIG. 2A, its description will be omitted. The second embodiment realizes execution control of the software in an arbitrary period.

In FIG. 6, a fixed-value input field 302, a date input field 303, a password display field 305, a Calculate Password button 304 and a End button 306 are identical to those of the display screen in FIG. 3 except that a date to be input in the date input field 303 is the first day of a period during which execution of application software to be executed by the client 102 is permitted.

A period input field 603 is where the number of days of the period during which execution of application software by the client 102 is permitted is input.

As one example, a password character string, "2EA968$20", is displayed in the password display field 305 in FIG. 6. Here, "$" (dollar symbol) is a separator. The separator separates a character string. A hash character string equivalent to the body of the password character string is "2EA968" before $. "20" following $ is the number of days. In this example, the password character string is comprised of characters excluding "$" and the number of days is expressed by a numeral. A possible example of a character string excluding "$" is a combination of 0 to 9 and A to F, which are characters giving a hexadecimal notation.

Figure 7A:
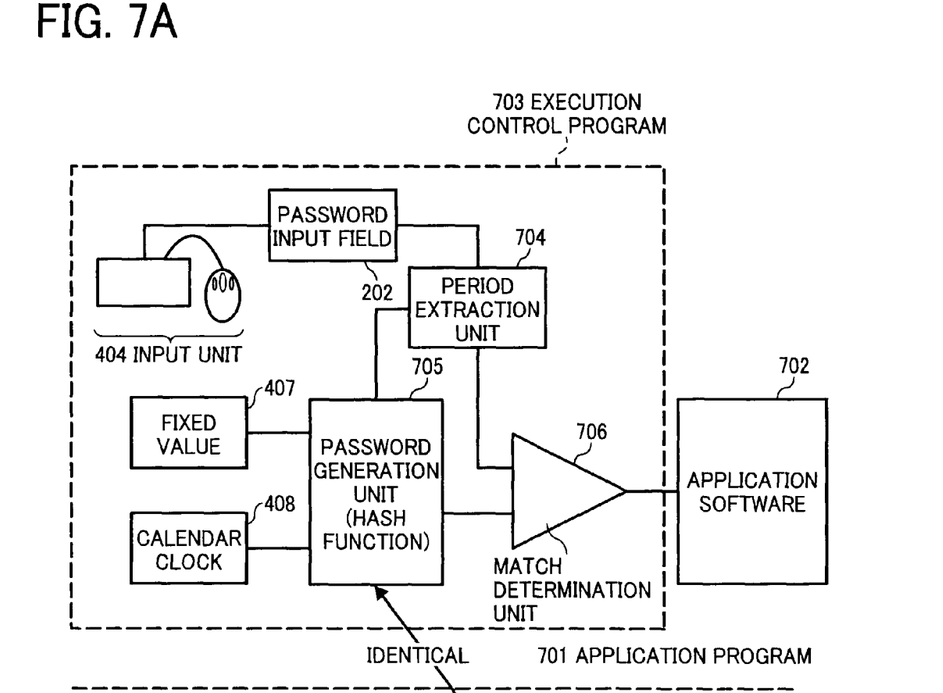
FIG. 7A is a functional block diagram of an application program including an execution control program.
Figure 7B:
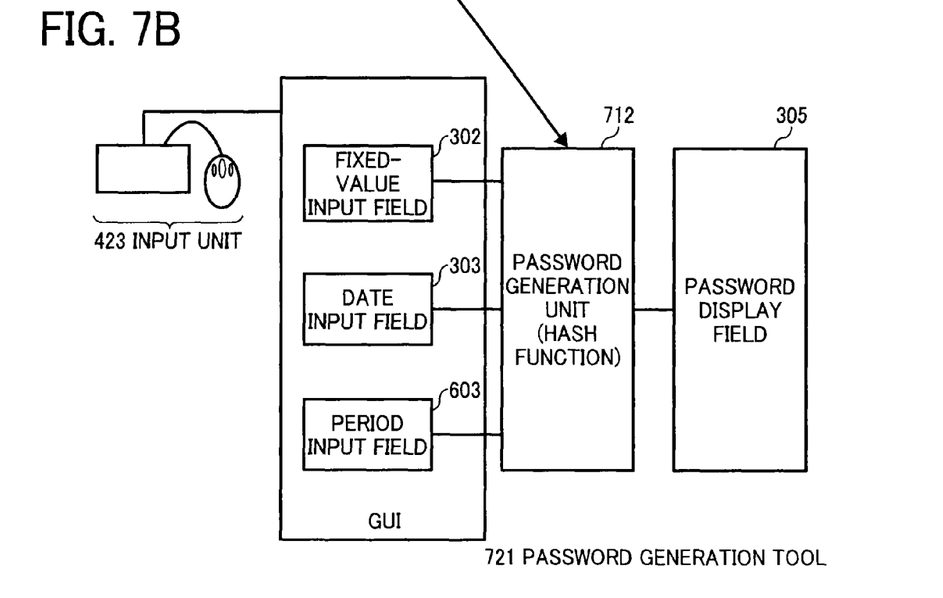
FIG. 7B is a functional block diagram of the password generation tool.

FIGS. 7A and 7B are functional block diagrams of an application program 701 including an execution control program 703, and a password generation tool 721. Those components in FIGS. 7A and 7B which are functionally identical to the corresponding components in FIGS. 4A and 4B are given same reference numerals to avoid repeating their descriptions.

In FIG. 7A, a period extraction unit 704 extracts a character string of a part indicating a period from a password character string acquired from the password input field 202 through the character string separator.

A password generation unit 705 generates a hash character string using the hash function based on a fixed value character string acquired from the fixed value 407, a date character string of that day acquired from the calendar clock 408 and a period character string acquired from the period extraction unit 704.

A match determination unit 706, which is functionally identical to the match determination unit 406 in FIG. 4A, performs a loop process by the number of days of a designated period in cooperation with the password generation unit 705. The details of the operation will be described later referring to a flowchart in FIG. 8.

There are three input fields, the fixed-value input field 302, the date input field 303 and the period input field 603, provided in the GUI.

Figure 8:
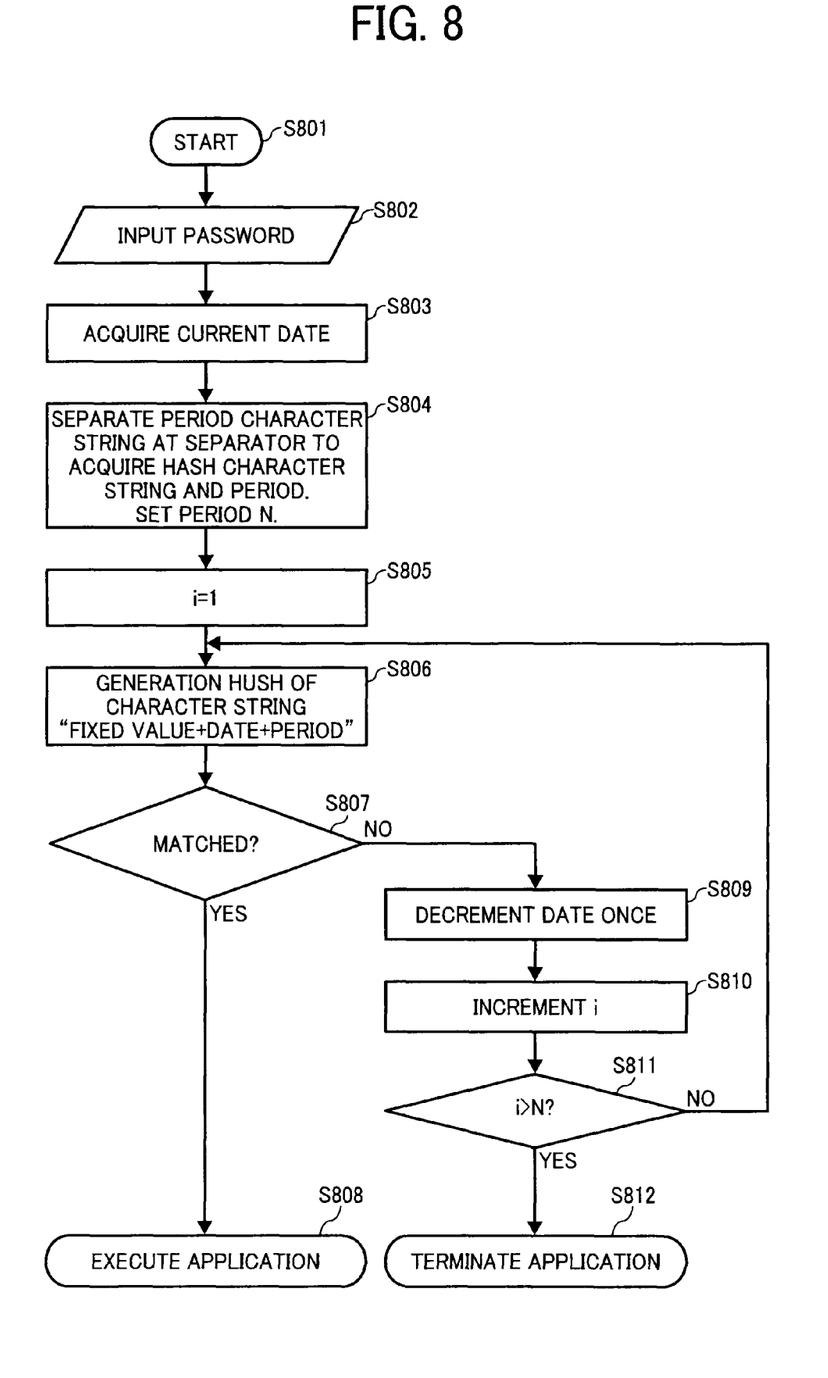
FIG. 8 is a flowchart of the execution control program.

FIG. 8 is a flowchart of the execution control program 703 shown in FIG. 7A.

When the execution control program 703 is activated (S801), the execution control program 703 displays a password input screen on the display 104 of the personal computer 103, and waits for a password input by the user (S802).

When the user enters the password and presses the OK button, the password generation unit 705 of the execution control program 703 acquires a current date from the calendar clock 408 (S803).

Then, the period extraction unit 704 of the execution control program 703 separates the password character string at the separator to acquire a hash character string and a period. The hash character string is the body of the password. The period is the one during which execution of the application program is permitted. The period is set to a variable N (S804).

Then, the execution control program 703 sets an initial value of "1" to a counter variable i (S805).

A loop process follows the step.

First, the password generation unit 705 of the execution control program 703 generates a hash character string using the hash function which is the body of the password generation unit 705, based on the character string of the fixed value held internally, the character string of the date and the character string of the period (S806).

The match determination unit 706 of the execution control program 703 determines whether the hash character string generated by the password generation unit 705 matches with the password character string input in the password input field 202 and separated at the separator by the period extraction unit 704 or not (S807).

When there is a match (S807: YES), application software 702 which is the body of the application program 701 is activated (S808).

When there is no match (S807: NO), the execution control program 703 decrements the date character string once (S809). Specifically, after the date character string is converted to date data once, the date data is decremented once and then converted to a character string again. For example, a date character string "20061010" is decremented to "20061009".

Next, the execution control program 703 increments the counter variable i (S810). Then, the counter variable i is compared with the period N (S811). When the counter variable i does not exceed the period N (S811: NO), the password generation unit 705 generates a hash character string again based on the "character string of the fixed value"+the "character string of the decremented date"+the "character string of the period" (S806).

When there is a match on the hash character string in the period N (S807: YES), the application software 702 is activated (S808).

When there is no match (S807: NO), the application program 701 is terminated (S812).

The second embodiment can control execution of application software in a designated period. This function can allow a user to execute the application software in an arbitrary period. The embodiment is particularly effective for a program like shareware, whose executable period is set according to the payment of money for software.

The reason for including a period in the process of generating a hash character string is that unless a period is included in an original character string, an arbitrary period can be set to evade the execution control.

The following application examples are feasible for the embodiment.

(1) While a usable period is set based on the number of days in the second embodiment, it can also be set by time such as minutes.

(2) Various methods are available in installing an encrypted execution control program.

The simplest installation is to code the execution control program together with the program body based on source codes.

Alternatively, the execution control program can be installed as an external library.

The execution control program may be installed as a kind of a shell in which an execution file for a program to be subjected to execution control is included.

In case of an external library or the like, a hash algorithm can be changed later by replacing the library with another one.

(3) There are various modes of installing a fixed value.

The fixed value may be defined as a constant in the source codes, or recorded in an external file or a registry.

With a fixed value held externally, the fixed value can be changed as needed in terms of security.

(4) The examination tool 401 may have a plurality of fixed values 407 according to which the functions that can be used by the application software 402 is limited.

In one example, when a fixed value A results in execution permission, all the functions of the application software 402 can be used, whereas when a fixed value B results in execution permission, only some of the functions of the application software 402 can be used. This technical concept can also be adapted to the application program 701.

The second embodiment can achieve password-based period-limited execution control of an independent program regardless of a network or the like.

This application claims the priority of Japanese Patent Application No. 2006-286421 filed on Oct. 20, 2006, the entire contents of which are incorporated herein by reference.

What is claimed is:

1. A software execution control method for allowing a predetermined apparatus to execute a target program, comprising:

a password reception step of displaying a user interface to obtain an input of a password and accepting an input of the input password;

a password generation step of generating a generation password from a fixed value held in the apparatus and a time character string indicating a current time, acquired from a calendar clock provided in the apparatus, by using a predetermined algorithm, wherein the fixed value designates less than full access to functionality of the target program;

a match determination step of collating an input password input at the password reception step with the generation password generated at the password generation step, and executing a target program when a character string of the input password matches with a character string of the generation password;

a period subtraction step of subtracting one day from the time indicated by the time character string acquired from the calendar clock provided in the apparatus, when a character string of the input password does not match with a character string of the generation password;

when the one day is subtracted from the time indicated by the time character string, a step of determining whether or not the time indicated by the time character string is within a validity period of the input password, by incrementing a counter variable by one;

another password generation step of generating another password from the fixed value held in the apparatus and a time character string indicating a time resulting from subtraction at the period subtraction step by using the predetermined algorithm; and another match determination step of collating the another password with the input password.

2. The software execution control method according to claim 1, further comprising:

a period extraction step of extracting a period character string indicating a period from an input password input at the password reception step, wherein at the period extraction step, the character string of the password input at the password reception step is separated into a hash character string and a period character string by a separator to extract the period character string.

3. A software execution control system comprising:

a password generation device which generates a password; and a terminal device which executes a target program based on the password, the password generation device including, a fixed-value acquisition unit that acquires a fixed-value character string, a time acquisition unit that acquires a time character string indicating a time, and a basic password generation unit that generates a basic password from the fixed-value character string acquired by the fixed-value acquisition unit and the time character string acquired by the time acquisition unit by using a predetermined algorithm, and the terminal device including, a password reception unit that displays a user interface to obtain an input of a password and accepts an input of the input password, a password generation unit that generates a generation password from a fixed value held in the apparatus and a time character string indicating a current time, acquired from a calendar clock provided in the apparatus by using a same algorithm as the predetermined algorithm, wherein the fixed value designates less than full access to functionality of the target program, a match determination unit that collates an input password received by the password reception unit with the generation password generated by the password generation unit, and executing the target program when a character string of the input password matches with a character string of the generation password or when the input password is identical to the basic password, a period subtraction unit that subtracts one day from the time indicated by the time character string acquired from the calendar clock when a character string of the input password does not match with a character string of the generation password, when the one day is subtracted from the time indicated by the time character string, the password generation unit of the terminal device determines whether or not the time indicated by the time character string is within a validity period of the input password, by incrementing a counter variable by one, and wherein the password generation unit of the terminal device generates another password from the fixed value held in the apparatus and a time character string indicating a time resulting from subtraction performed by the period subtraction unit by using the predetermined algorithm, and the match determination unit of the terminal device collates the input password with the another password.

4. The software execution control system according to claim 3, wherein the terminal device further comprises:

a period extraction unit that extracts a period character string indicating a period from the input password accepted by the password reception unit, wherein the period extraction unit of the terminal device separates the character string of the password accepted by the password reception unit into a hash character string and a period character string by a separator to extract the period character string.

5. A non-transitory computer readable storage medium encoded with instructions, which when executed by a computer causes the computer to implement a method for allowing the computer to execute a target program, the method comprising:

a password reception step of displaying a user interface to obtain an input of a password and accepting an input of the input password;

a password generation step of generating a generation password from a fixed value held in the apparatus and a time character string indicating a current time, acquired from a calendar clock provided in the apparatus, by using a predetermined algorithm, wherein the fixed value designates less than full access to functionality of the target program;

a match determination step of collating an input password input at the password reception step with the generation password generated at the password generation step, and executing a target program when a character string of the input password matches with a character string of the generation password;

a period subtraction step of subtracting one day from the time indicated by the time character string acquired from the calendar clock provided in the apparatus, when a character string of the input password does not match with a character string of the generation password;

when the one day is subtracted from the time indicated by the time character string, a step of determining whether or not the time indicated by the time character string is within a validity period of the input password, by incrementing a counter variable by one;

another password generation step of generating another password from the fixed value held in the apparatus and a time character string indicating a time resulting from subtraction at the period subtraction step by using the predetermined algorithm; and another match determination step of collating the another password with the input password.

* * * * *